(12) United States Patent
Eversole (10) Patent No.: US 11,272,682 B2
(45) Date of Patent: Mar. 15, 2022

(54) ANIMAL HOUSE SIDEWALL INLET

(71) Applicant: The GSI Group, LLC, Assumption, IL (US)

(72) Inventor: Nathan Robert Eversole, Assumption, IL (US)

(73) Assignee: The GSI Group LLC, Assumption, IL (US)

( * ) Notice: Subject to any disclaimer, the term of this patent is extended or adjusted under 35 U.S.C. 154(b) by 184 days.

(21) Appl. No.: 16/731,413

(22) Filed: Dec. 31, 2019

(65) Prior Publication Data

US 2020/0205370 A1    Jul. 2, 2020

Related U.S. Application Data

(60) Provisional application No. 62/786,650, filed on Dec. 31, 2018.

(51) Int. Cl.
| | |
|---|---|
| *E05F 11/00* | (2006.01) |
| *A01K 1/00* | (2006.01) |
| *E05F 11/12* | (2006.01) |
| *E05F 11/06* | (2006.01) |
| *F24F 7/00* | (2021.01) |

(52) U.S. Cl.
CPC ............ *A01K 1/0064* (2013.01); *E05F 11/06* (2013.01); *E05F 11/12* (2013.01); *F24F 7/00* (2013.01); *E05Y 2201/604* (2013.01); *E05Y 2201/624* (2013.01); *E05Y 2201/654* (2013.01); *E05Y 2201/668* (2013.01); *F24F 2007/0025* (2021.01)

(58) Field of Classification Search
CPC ....... F24F 2007/0025; F24F 2013/1453; F24F 13/1426; E05Y 2201/668; E05Y 2201/604; E05Y 2201/624; E05Y 2201/618; E05Y 2201/654; E05Y 2900/148; E05Y 2900/11; E05F 17/00; E05F 2017/008
USPC .............. 49/357, 24; 119/19, 493, 494, 524
See application file for complete search history.

(56) References Cited

U.S. PATENT DOCUMENTS

| | | | | |
|---|---|---|---|---|
| 776,559 | A * | 12/1904 | Smith ..................... | E05F 17/00 49/3 |
| 3,973,173 | A * | 8/1976 | Smith ..................... | E05F 1/002 361/195 |
| 4,155,204 | A * | 5/1979 | Prozinski ............ | E04B 1/34336 52/69 |
| 4,428,278 | A * | 1/1984 | Sutton, Jr. .............. | A01K 1/007 119/448 |
| 6,481,156 | B1 * | 11/2002 | Richmond ........... | A01K 1/0017 49/24 |
| 6,871,842 | B2 * | 3/2005 | Sutton ..................... | B66D 1/06 119/493 |

(Continued)

FOREIGN PATENT DOCUMENTS

| | | | | |
|---|---|---|---|---|
| GB | 625798 | A * | 7/1949 | ............. F24F 13/15 |
| GB | 866123 | A * | 4/1961 | ............. F24F 13/15 |
| GB | 2207233 | A * | 1/1989 | ............... A62C 2/14 |

*Primary Examiner* — Jerry E Redman (57) ABSTRACT

An assembly for controlling the position of air inlets of an enclosure including an actuation rod which moves laterally and is positioned above and parallel with the air inlets, one or more actuation cables, where the first end of each actuation cable is attached to the actuation rod and the second end of each cable is attached to one or more of the air inlets and lateral movement of the actuation rod causes vertical movement of the actuation cables and attached air inlets.

8 Claims, 6 Drawing Sheets

(56) References Cited

U.S. PATENT DOCUMENTS

| | | | | |
|---|---|---|---|---|
| 8,065,976 B1 * | 11/2011 | Bryant | ................... | A01K 1/10 |
| | | | | 119/449 |
| 8,327,805 B2 * | 12/2012 | Rogge | ................. | A01K 1/0064 |
| | | | | 119/493 |
| 10,869,457 B1 * | 12/2020 | Brandley | ............... | A01K 31/02 |
| 2018/0216393 A1 * | 8/2018 | Brandley | ............... | A01K 31/02 |
| 2020/0205370 A1 * | 7/2020 | Eversole | ............. | A01K 1/0064 |

\* cited by examiner

ANIMAL HOUSE SIDEWALL INLET

BACKGROUND OF THE INVENTION

Field of Invention

The present disclosure is generally related to ventilation inlets, and, in particular, to a sidewall inlet for use in animal houses.

Description of Related Art

Achieving optimal performance from animals raised in commercial animal house buildings (such as a poultry house) depends on providing ventilation as correctly and efficiently as possible. Proper ventilation improves overall air quality, air temperature, energy use and animal health. Improper ventilation levels can lead to incorrect moisture levels, unsuitable temperatures, poor air quality and impact animal productivity and overall health. Sidewall inlets are often used as part of the ventilation system for animal houses. Typical sidewall inlets allow the cool air to simply drop into the animal house. This does not provide for an efficient flow and circulation of air within the animal house.

Desirably, airflow entering through properly designed sidewall inlets travels along the ceiling toward the center of the animal house where it gently moves downward towards the floor as stale warmer air rises upward thus displacing the cooler air and creating a fresh air circulating pattern. It is desirable to direct the travel of incoming airflow along the ceiling so that cool incoming air will be sufficiently warmed by the warm air moving upward from the floor and collecting at the ceiling. It is known to use a sidewall inlet having a curved louver blade to help achieve desired airflow and air mixing in animal houses. Curved shutter blade help direct air across the ceiling and create a more efficient air flow to reach the center of wider animal houses. However, it would be desirable to have better systems to control the position of the blades of the sidewall inlets.

SUMMARY OF THE INVENTION

According to one aspect of the invention, an actuation assembly controls one or more air inlets of an enclosure. The actuation assembly includes an actuation rod configured for lateral movement and at least one actuation cable, with each actuation cable having a first end attached to the actuation rod and a second end. The actuation assembly has at least one louver blade mounted between opposing side panels of an air inlet, each of the at least one louver blade being pivotable about a pivot axis between an open position and a closed position. Each at least one louver blade has an arm mechanism with one end of the arm mechanism configured to attach to a distal edge of the louver blade and an opposite end of the arm mechanism configured to receive and adjustably secure the second end of a respective one of the at least one actuation cables. The arm mechanism includes a pivot arm having a spindle on which a turn knob is mounted, wherein the turn knob is configured to receive the actuation cable, wherein the pivot arm is configured such that the spindle is located at a position that is further from a pivot axis of the louver blade than the distal edge of the louver blade thereby providing a larger moment arm so that less force is required to pull the louver blade open and closed positions. In one aspect, the pivot arm has a plurality of female dimples formed in a surface of the pivot arm surrounding the spindle and the turn knob has corresponding plurality of projections that mates with the dimples on the pivot arm, An outer face of the turn knob has a hex-end such that when it is desired to adjust the actuation cable, the turn knob can be turned relative to the pivot arm such that the alignment of the dimples and projections is altered.

These and other aspects are achieved by the present invention, which is described in detail in the following specification and the accompanying drawings which form a part hereof

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF PREFERRED EMBODIMENTS

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 1:
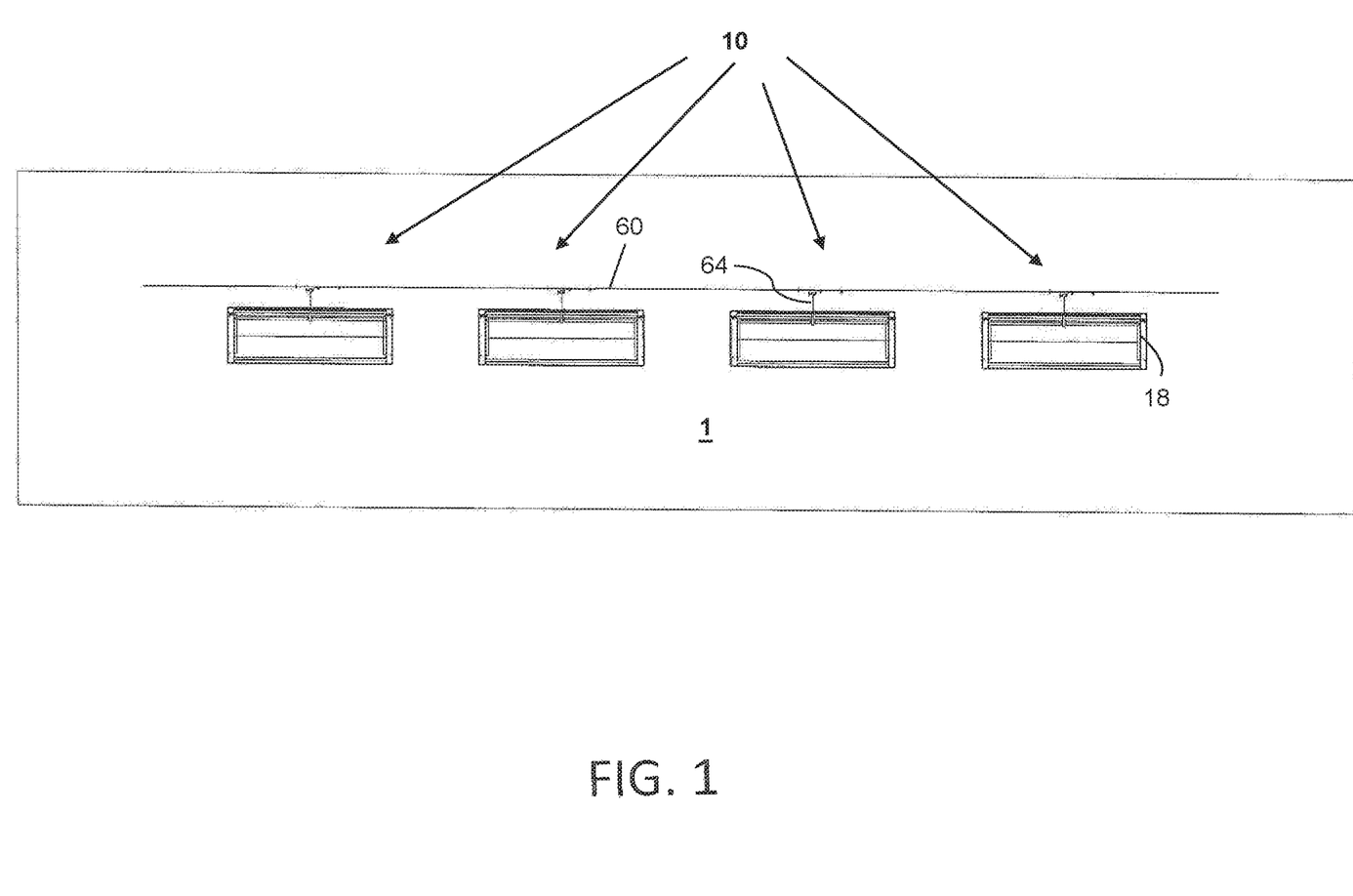
FIG. 1 shows exemplary placement of a plurality of sidewall inlets mounted in a sidewall of an animal house.

FIG. 1 illustrates a sidewall 1 of an animal house having a plurality of sidewall inlets 10. As is known in the art, sidewall inlets are used as part of an overall ventilation system for the animal houses to enable adequate and efficient airflow and circulation within the animal house.

Figure 2:
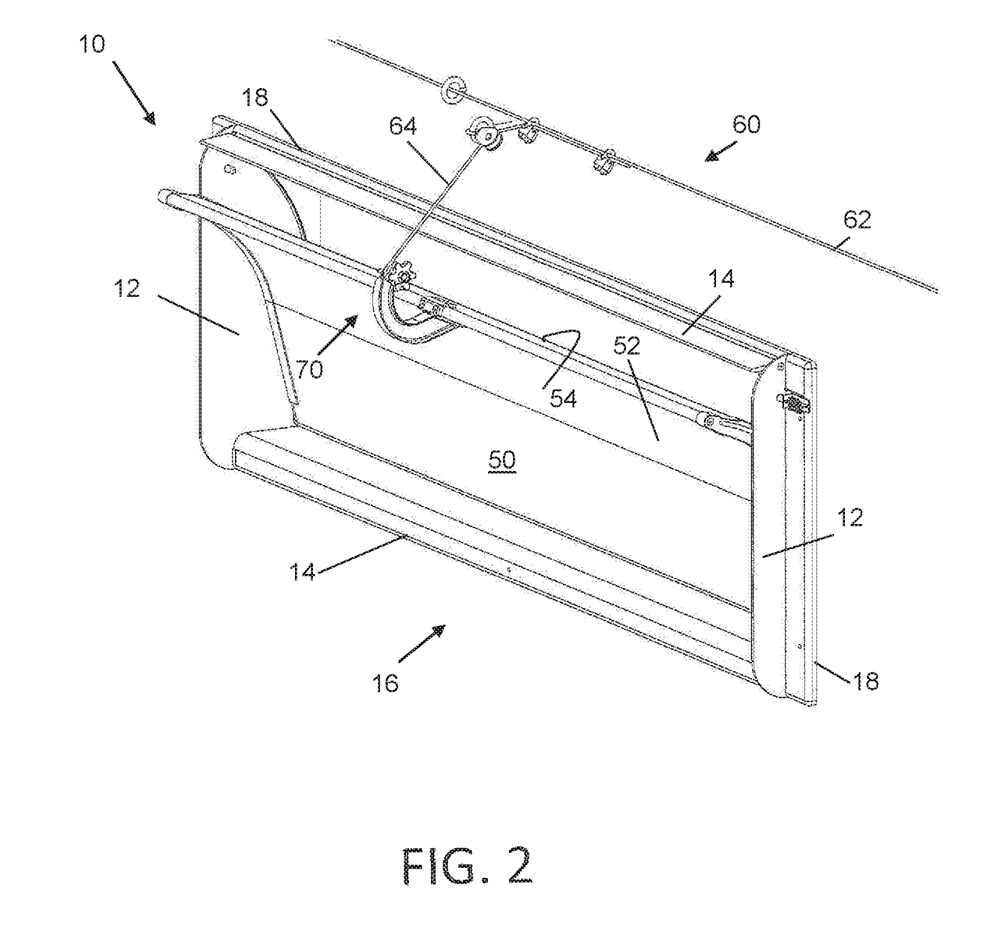
FIG. 2 is a perspective view of a sidewall inlet according to an embodiment of the invention.

Turning now to FIG. 2, each sidewall inlet 10 comprises a pair of opposed end panels 12 and a pair of opposed side panels 14 which, in combination, define a frame 16 which defines an opening to allow airflow through the sidewall 1 (FIG. 1) into the animal house. As seen, the frame 16 is generally quadrilateral in shape. The frame may be made from a variety of materials, including metal and/or plastic. The end panels 12 and side panels 14 can be independent pieces which are assembled together to form the frame 16. Alternatively, the frame 16 can be a one-piece, unitary element of the sidewall inlet 10. A flange 18 extends around the frame 16. The flange 18 is a mounting flange which rests on a surface of the sidewall 1 in which the sidewall inlet 10 is installed, as seen in FIG. 1.

A louver blade 50 is pivotally mounted in the frame 16. The louver blade 50 extends between the side panels 14. The louver blade 50 has an inner surface 52 and an outer surface 54. In one embodiment, the louver inner surface 52 desirably defines a substantially continuous curve from a lower edge to an upper edge of the louver 50. The louver 50 is pivotally mounted in the frame 16 to be movable between an open position and a closed position about a pivot axis formed by pivot pins xx which extend from the opposite edges of the louver blade 50. The pins xx extend through openings in the end panels 12 and can be integral with the louver blade 50, or can comprise rods or screws which extend through the openings into the end edge of the louver blade 50. Alternately, the pins could be integrally formed with the end panels 12, and be received in holes in the edges of the louver blade 50. The louver blade 50 may be moved to the open or closed position under gravity, however is desirably moved to the open position under gravity.

Figure 3:
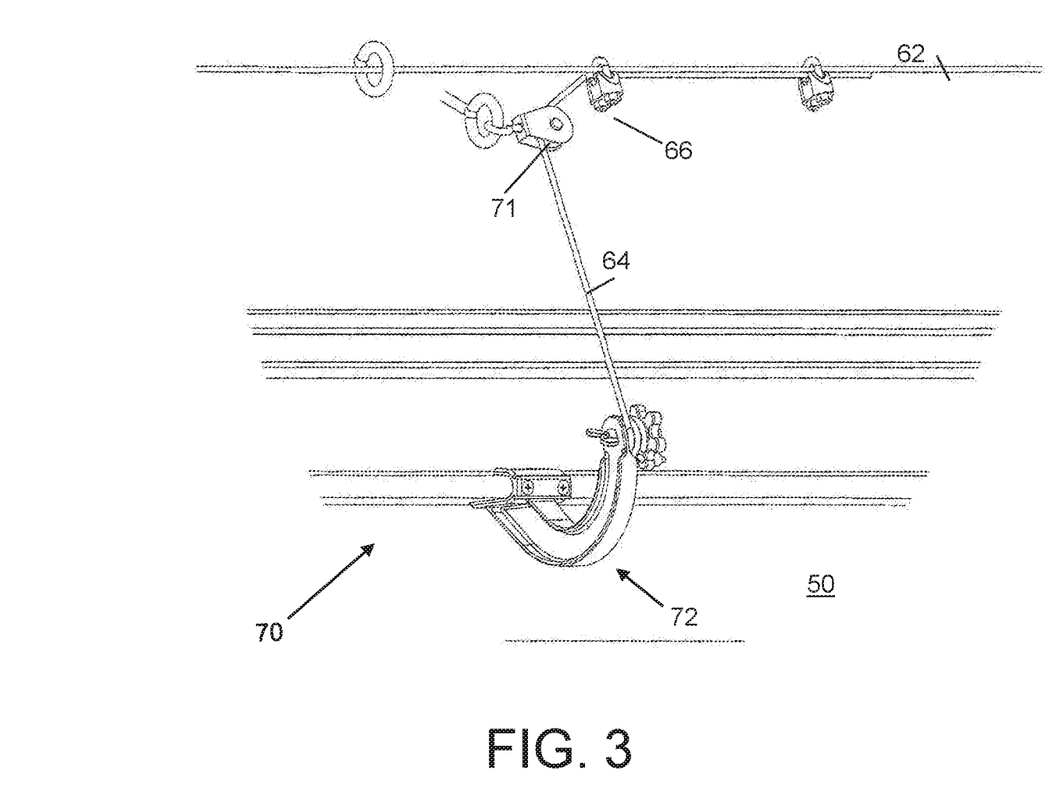
FIG. 3 is an enlarged perspective view of a portion of the sidewall inlet of FIG. 2 showing the actuation arm.

As best seen in FIG. 1, an actuation assembly 60 extends across the sidewall 1 and controls the condition of each of the sidewall inlets 10. As seen in FIG. 2, the actuation assembly 60 includes an actuation rod 62 running above the sidewall inlets configured for back and forth movement. The movement of the actuation rod 62 can be performed manually or by a mechanical actuator. Each sidewall inlet 10 has an individual actuation cable 64 that connects to the louver blade 50. The actuation cable 64 can be a cord, string, rope or the like. As best seen in to enlarged view of FIG. 3, a first end of the actuation cable 64 is clamped or otherwise fastened to the actuation rod 62 with a fastener 66 using any means known in the art. A second end is connected to an arm mechanism 70 attached to the louver blade 50. In one embodiment, the actuation cable 64 runs through a pulley 71 in near vertical alignment with the arm mechanism 70 so that back and forth movement of the actuation rod 62 causes the actuation cable 64 to pull the louver blade 50 into the closed position or to drop under the force of gravity to the open position. In another embodiment, the actuation cable 64 runs through a pulley 71 in near vertical alignment with the arm mechanism 70 so that back and forth movement of the actuation rod 62 causes the actuation cable 64 to pull the louver blade 50 into the open position or to drop under the force of gravity to the closed position. Accordingly, movement of the actuation rod 62 is used to control the condition of the plurality of sidewall inlets 10.

Figure 4:
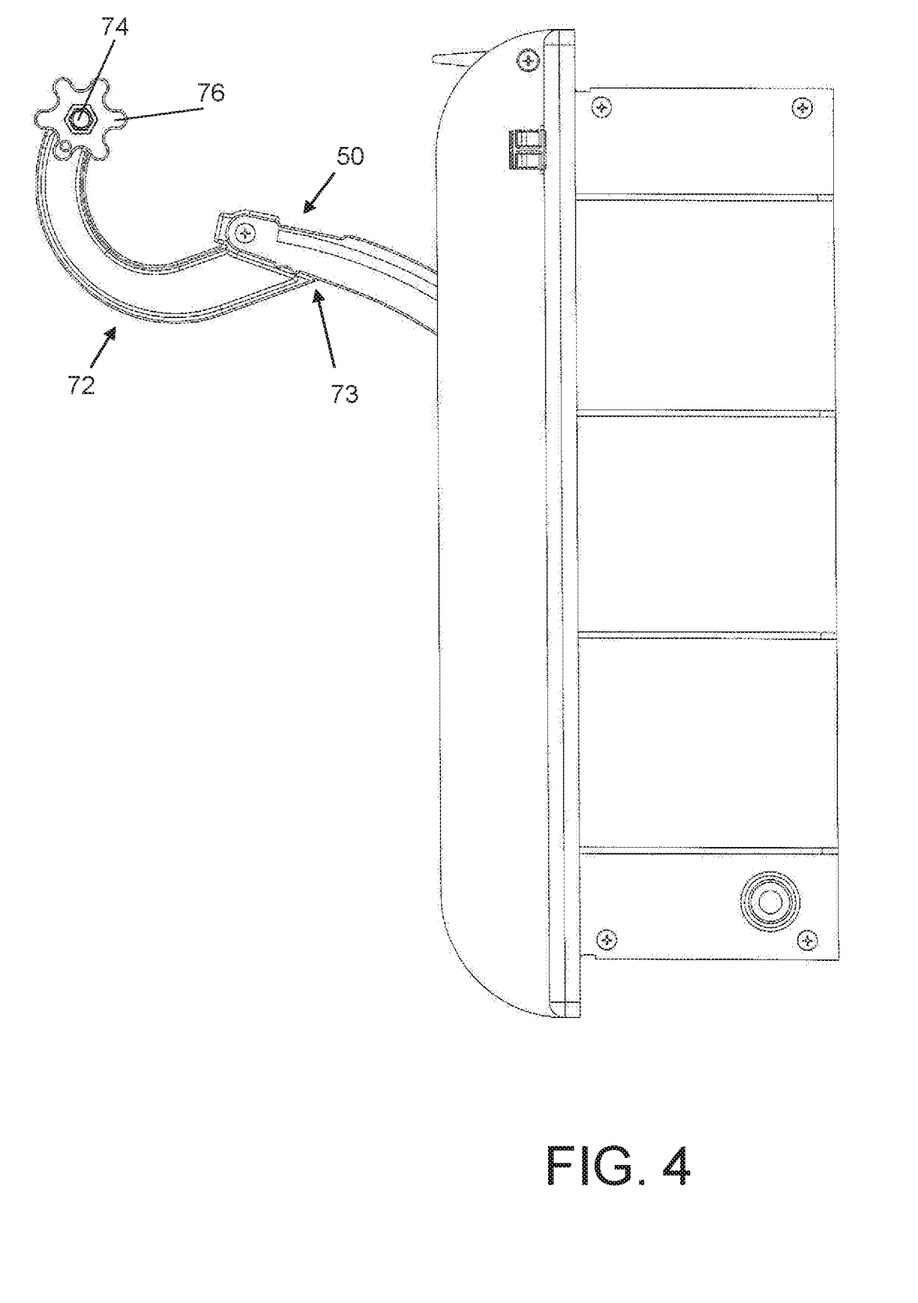
FIG. 4 is a side view of the sidewall inlet of FIG. 2.
Figure 5:
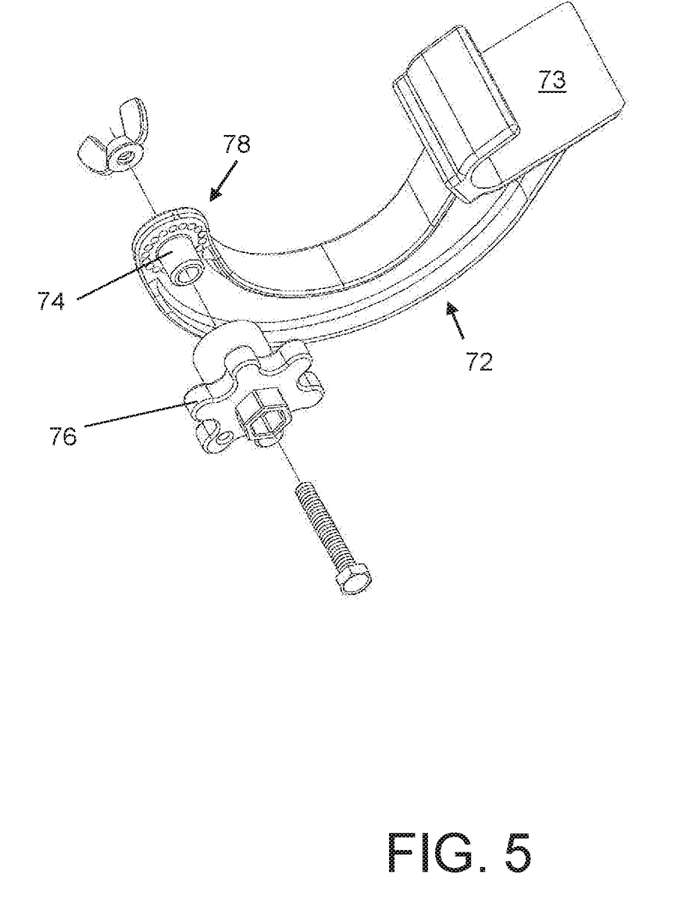
FIG. 5 is an exploded perspective view of the actuation arm.

Turning now to FIGS. 4 and 5, one embodiment of the arm mechanism 70 has a pivot arm 72 with a mounting hook 73 at one end that attaches to a distal end of the louver blade 50. An opposite end of the pivot arm 72 has a spindle 74 on which a turn knob 76 is mounted. The turn knob 76 is configured to receive the actuation cable 64. It can be seen that the arm mechanism 70 extends the point where the actuation cable 64 is mounted to the louver blade 50 to a point that is further from the pivot axis of the louver blade 50 that the distal end of the louver blade 50 to which the pivot arm is attached, thereby providing a larger moment arm so that less force is required to pull the louver blade 50 from the open to the closed position or closed to open position. This results in less stretch of the actuation cable 64 so that more precise control of the louver blade 50 can be achieved and also allows more sidewall inlets 10 to be opened or closed by the actuation assembly 60 without increasing the size of the mechanical actuator used to move the actuation rod 62.

Figure 6:
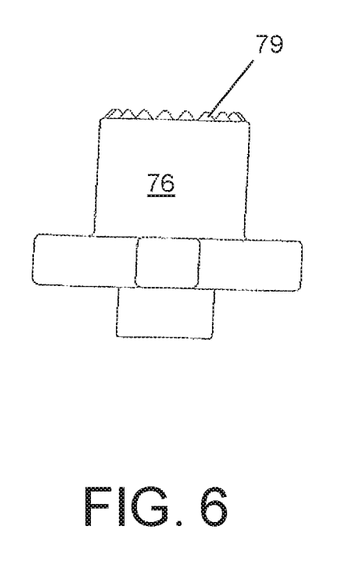
FIG. 6 is a side view of a tension control knob of the actuation arm.

In one embodiment, the pivot arm 72 has a spindle 74 on which a hub of the turn knob 76 is received. A plurality of female dimples 78 is formed in the surface of the pivot arm surrounding the spindle 74. As seen in FIG. 6, a corresponding plurality of projections 79 is formed in the hub of the turn knob 76 that mates with the dimples 78 on the pivot arm 72. A suitable connection means, such as a bolt and nut, fasten the turn knob 76 on the pivot arm. Desirably, an outer face of the turn knob 76 has a hex-end such that when it is needed to adjust the actuation cable 64, such as to account for cable stretch, the nut can be loosened and the operator can use a wrench to turn the turn knob 76 relative the pivot arm such that the alignment of the dimples 78 and projections 79 is altered and then re-tighten the nut.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. An actuation assembly for controlling one or more air inlets of an enclosure, the assembly comprising:
   an actuation rod configured for lateral movement;
   at least one actuation cable, each of the at least one actuation cables comprising a first end and a second end, wherein the first end is attached to the actuation rod;
   at least one louver blade mounted between opposing side panels of an air inlet, each of the at least one louver blade being pivotable about a pivot axis between an open position and a closed position, wherein each at least one louver blade has an arm mechanism with one end of the arm mechanism configured to attach to a distal edge of the louver blade and an opposite end of the arm mechanism configured to receive and adjustably secure the second end of a respective one of the at least one actuation cables, wherein the arm mechanism comprises a pivot arm having a spindle on which a turn knob is mounted, wherein the turn knob is configured to receive the actuation cable, wherein the pivot arm is configured such that the spindle is located at a position that is further from a pivot axis of the louver blade than the distal edge of the louver blade thereby providing a larger moment arm so that less force is required to pull the louver blade between the open and closed positions.

2. The actuation assembly of claim 1 wherein the pivot arm has a mounting hook at one end that attaches to the louver blade.

3. The actuation assembly of claim 1 wherein the pivot arm has a plurality of female dimples formed on a surface of the pivot arm surrounding the spindle and the turn knob has a corresponding plurality of projections that mate with the dimples on the pivot arm.

4. The actuation assembly of claim 1, wherein to adjust the actuation cable, the turn knob can be turned relative to the pivot arm such that the alignment of the dimples and projections is altered.

5. The actuation assembly of claim 4, wherein an outer face of the turn knob has a hex-end such that to adjust the actuation cable, the turn knob can be turned relative to the pivot arm using a tool that interacts with the hex-end such that the alignment of the dimples and projections is altered.

6. The actuation assembly of claim 1 wherein the actuation assembly is configured so that lateral movement of the actuation rod causes vertical movement of the one or more actuation cables.

7. The actuation assembly of claim 1 wherein the louver blade comprises an inner surface and an outer surface wherein the inner surface defines a substantially continuous curve from a lower edge to an upper edge of the louver blade.

8. The actuation assembly of claim 1 wherein the louver blade is moved to the open position under gravity.

* * * * *